(12) United States Patent
Turatti

(10) Patent No.: US 6,481,117 B2
(45) Date of Patent: Nov. 19, 2002

(54) APPARATUS FOR CONTINUOUSLY DRYING VEGETABLES, PARTICULARLY LEAF VEGETABLES

(75) Inventor: Antonio Turatti, Cavarzere (IT)

(73) Assignee: Turatti Srl (IT)

( * ) Notice: Subject to any disclaimer, the term of this patent is extended or adjusted under 35 U.S.C. 154(b) by 0 days.

(21) Appl. No.: 09/875,759

(22) Filed: Jun. 6, 2001

(65) Prior Publication Data

US 2001/0052192 A1 Dec. 20, 2001

(30) Foreign Application Priority Data

Jun. 14, 2000 (IT) .............................. 00A0324

(51) Int. Cl.[7] .................................................. F26B 9/00
(52) U.S. Cl. ........................... 34/164; 34/401; 34/252; 34/427; 34/429; 34/179; 34/181
(58) Field of Search .......................... 34/397, 401, 250, 34/251, 252, 427, 428, 429, 432, 435, 471, 504, 164, 168, 169, 171, 179, 180, 181, 201, 666

(56) References Cited

U.S. PATENT DOCUMENTS

| | | | |
|---|---|---|---|
| 1,415,010 A | 5/1922 | Benjamin | |
| 1,681,556 A | 8/1928 | Parker | |
| 4,062,202 A | * 12/1977 | Cloudy | 62/380 |
| 4,167,068 A | * 9/1979 | Tomadini | 34/164 |
| 4,176,465 A | * 12/1979 | Murray et al. | 34/31 |
| 4,189,850 A | * 2/1980 | Dieterich | 34/58 |
| 4,785,551 A | 11/1988 | Meyer | |
| 4,989,346 A | 2/1991 | Wilken | |
| 5,759,026 A | * 6/1998 | von Wedel | 432/77 |
| 6,105,273 A | * 8/2000 | Johanson et al. | 34/267 |
| 6,125,550 A | * 10/2000 | Kendall | 34/316 |
| 6,167,636 B1 | * 1/2001 | Kepplinger et al. | 34/246 |
| 6,230,421 B1 | * 5/2001 | Reed et al. | 34/401 |
| 6,233,844 B1 | * 5/2001 | Gallego Juarez et al. | 34/401 |

FOREIGN PATENT DOCUMENTS

| | | |
|---|---|---|
| EP | 0567197 | 10/1993 |
| FR | 2651644 | 3/1991 |
| WO | WO 96/26403 | 8/1996 |

* cited by examiner

Primary Examiner—Ira S. Lazarus
Assistant Examiner—K. B. Rinehart
(74) Attorney, Agent, or Firm—Samuels, Gauthier & Stevens

(57) ABSTRACT

The invention relates to an apparatus for continuously drying vegetables, particularly leaf vegetables, comprising a mechanical drying section and a thermodynamic drying section, said mechanical drying section comprising a preliminary dripping section and a water removal section, or de-watering section, and said thermodynamic drying section comprising a hot section and a cold section.

14 Claims, 8 Drawing Sheets

APPARATUS FOR CONTINUOUSLY DRYING VEGETABLES, PARTICULARLY LEAF VEGETABLES

The present invention relates an apparatus for continuously drying vegetables, particularly leaf vegetables.

More particularly, the invention, concerns an apparatus of the above kind, which allows the continuosly drying at high speed of delicate products, that could not be dried with the traditional centrifugation methods. As it is well known, in the last years an always large diffusion of the packaged vegetables commercialization occurred, said vegetables being already washed and ready to use by the consumer, particularly baby-leaf, lettuce heart, baby spinach, cresson, etc.

This diffusion determined the need of carrying out an optimum drying of the vegetables after its washing, before the packaging.

To this end, it is evident that there is a need to have an apparatus available to carry out a continuous step having a very high production rate.

In this field, it is included the solution, according to the present invention suggesting a new drying system realized in order to reduce the presence of free water on the whole or cut vegetable leaves, sold fresh within film bags, having a shelf—life of about 1–2 weeks when preserved within a refrigerator at a temperature of +4° C., usually known as 4° gamma products.

These and results are obtained, according to the present invention suggesting an apparatus providing two sections for the separation of the free water and comprises a first mechanical drying step and a second thermodynamic drying step.

It is therefore specific object of the present invention an apparatus for continuously drying vegetables, particularly leaf vegetables, comprising a mechanical drying section and a thermodynamic drying section, said mechanical drying section comprising a preliminary dripping section and a water removal section, or de-watering section, and said thermodynamic drying section comprising a hot section and a cold section.

Particularly, according to the invention, said preliminary dripping section comprises a conveyor belt on a vibrating section having variable dimensions.

More specifically, said conveyor belt is a plastic material belt of the "monofilo" kind.

Furthermore, according to the invention, said water removal section or de-watering section comprises a structure, preferably made up of steel, a monofilo lower belt with a vibration system in its initial section, a first high rate vacuum pump, for sucking water separated from the product due to the, vibrations and to the upper ventilation effect, a monofilo upper belt, preferably comprised of a metallic or plastic net, a second high rate vacuum pump, for sucking the separated water from the product, due to the vibrations and the upper ventilation effect, three upper fans, provided with adjustable flaps to adjust air flows and the consequent motion of the products, and collection means for the removed water.

Preferably, according to the invention, upper protection means can be provided, said means being provided with inspection porthole of the upper part.

Further, according to the invention, means for the adjustment of the distance between said two belts can be provided, the adjustment occurring in function of the kind of product to be worked.

Still according to the invention, said water removal action can be realized by mechanical action, employing pre-heated air or de-humidified air.

Always according to the invention, said hot section of the thermodynamic drying section provides a recirculation air operation.

Preferably, according to the invention, said hot section provides a hot water of vapor operated battery having an air process temperature adjustment probe, acting on a motorized valve feeding the heating fluid with a constant air flow rate, a de-humidification unit, preferably provided with an automatic device for the energetic saving with the switching from outer air operation mode (winter mode) to recirculation air operation condition (summer mode), a drying bed, preferably comprised of three overlapped conveyors, each one provided with electronic speed variator, preferably having a Vmax/Vmin ratio of 4, exchange batteries, assembled within an air treatment console, comprising a heat regenerator, allowing an energy saving of about 40% on both air flows, evaporated water condensation occurring on one battery, said battery being fed by glicolated water, of with other refrigerating fluid, at a temperature of −1° C./0° C., while on the other battery the heating of the air flow to the temperature required by the process, is carried out, a PLC controlled automatic system, as well as temperature, flow rate and humidity meters being provided, the ventilating section of the hot section being comprised of a centrifugal fan.

Preferably, said conveyor belts are made up of monofilo synthetic material, having the larger open surface and hole diameter compatible with the product to be worked, said conveyor belts being mounted overlapped on a common structure and placed within a insulated stainless steel structure, precisely made realized in order to prevent by-pass.

Still according to the invention, said drying process occurs counter-current, with the feeding of the product laterally from above and entrance of air from the opposite bottom side.

Particularly, according to the invention, the outer structure of the tunnel of the hot section is comprised of sandwich panels having a foamed polyurethane interspace, provided with stainless steel coating sheets.

Furthermore, according to the invention, air ejected from said hot section is collected by a stainless steel duct, to be conveyed to the cooling unit (condensation).

Always according to the invention, said cooling section is comprised of a "single passage" tunnel, and is provided with a ventilating section comprising two helicoidal fans and two batteries fed by glicolated water, or any other refrigerating fluid, a conveyor belt provided with PLC controlled electronic speed variety,.an air dryer of the adsorption kind with silica-gel rotor, to reduce the condense content in the first part of the cooling section, and mechanical cooling means, comprising the second part of the cooling section.

Preferably, both the air temperature and the belt speed of the cooling section are adjustable.

The present invention will be now described, for illustrative but not limitative purposes, according to its preferred embodiments, with particular reference to the figures of the enclosed drawings, wherein.

Figure 3:
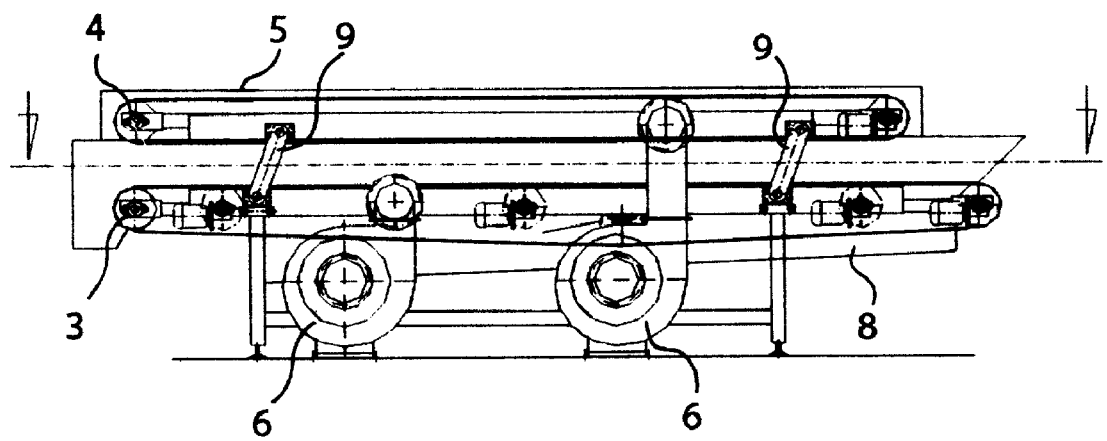
FIG. 3 is a lateral view of a first embodiment of a second section or de-watering section of the apparatus according to the invention.
Figure 4:
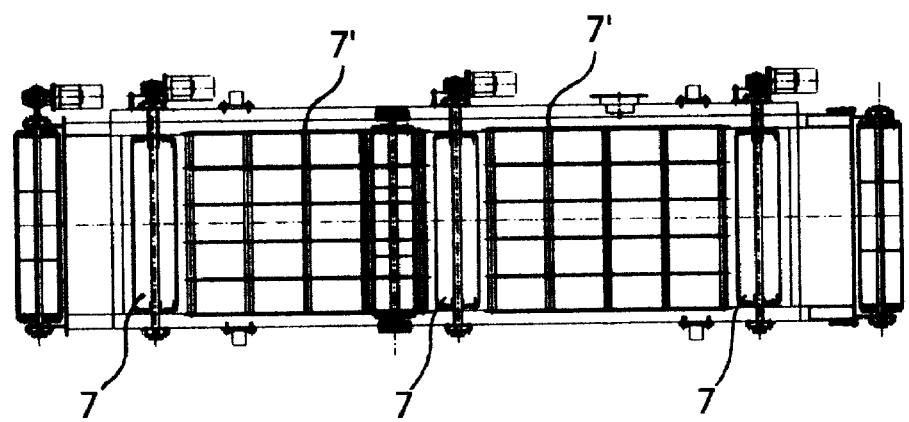
FIG. 4 is a lateral view of the section of FIG. 3.
Figure 5:
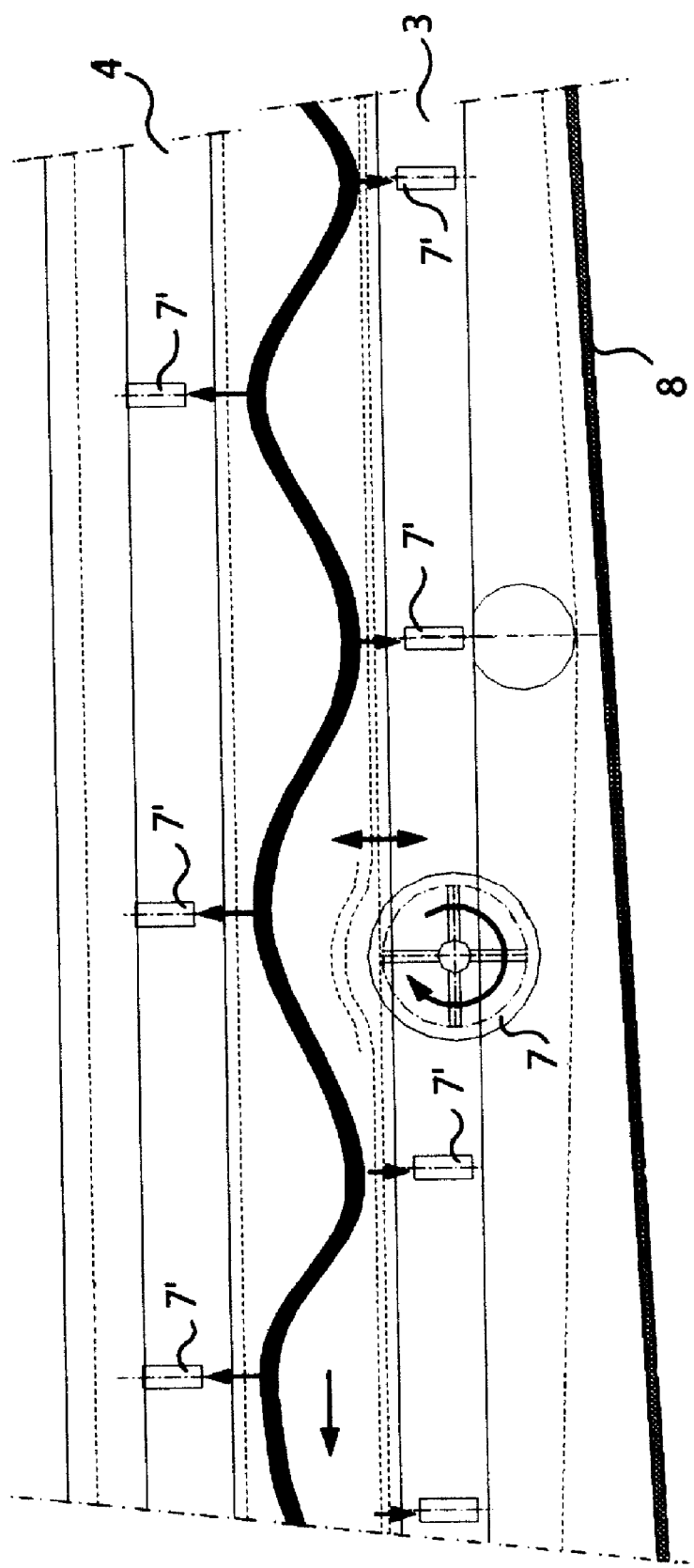
Figure 6:
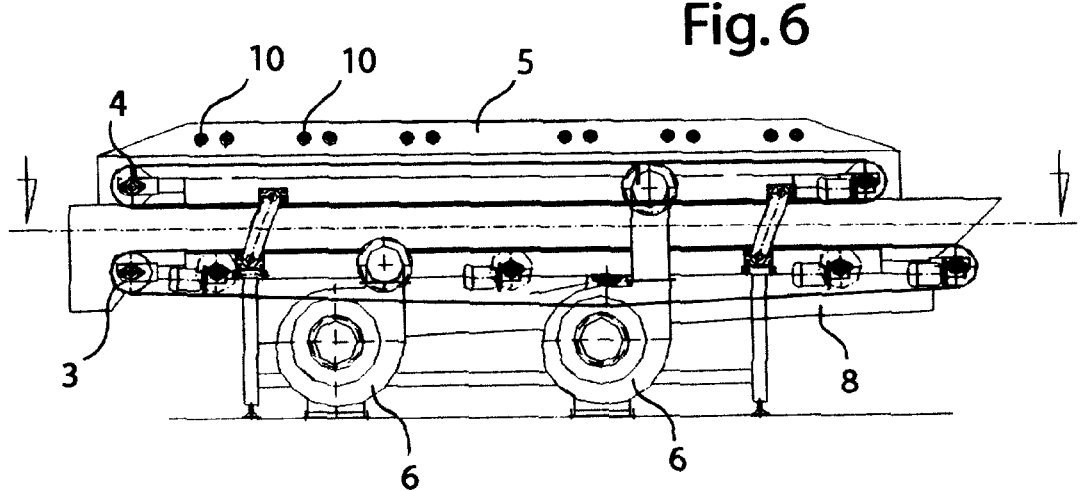
Figure 7:
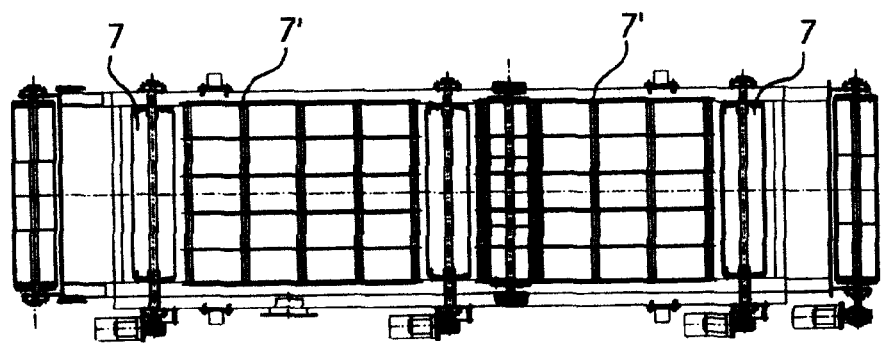
Figure 8:
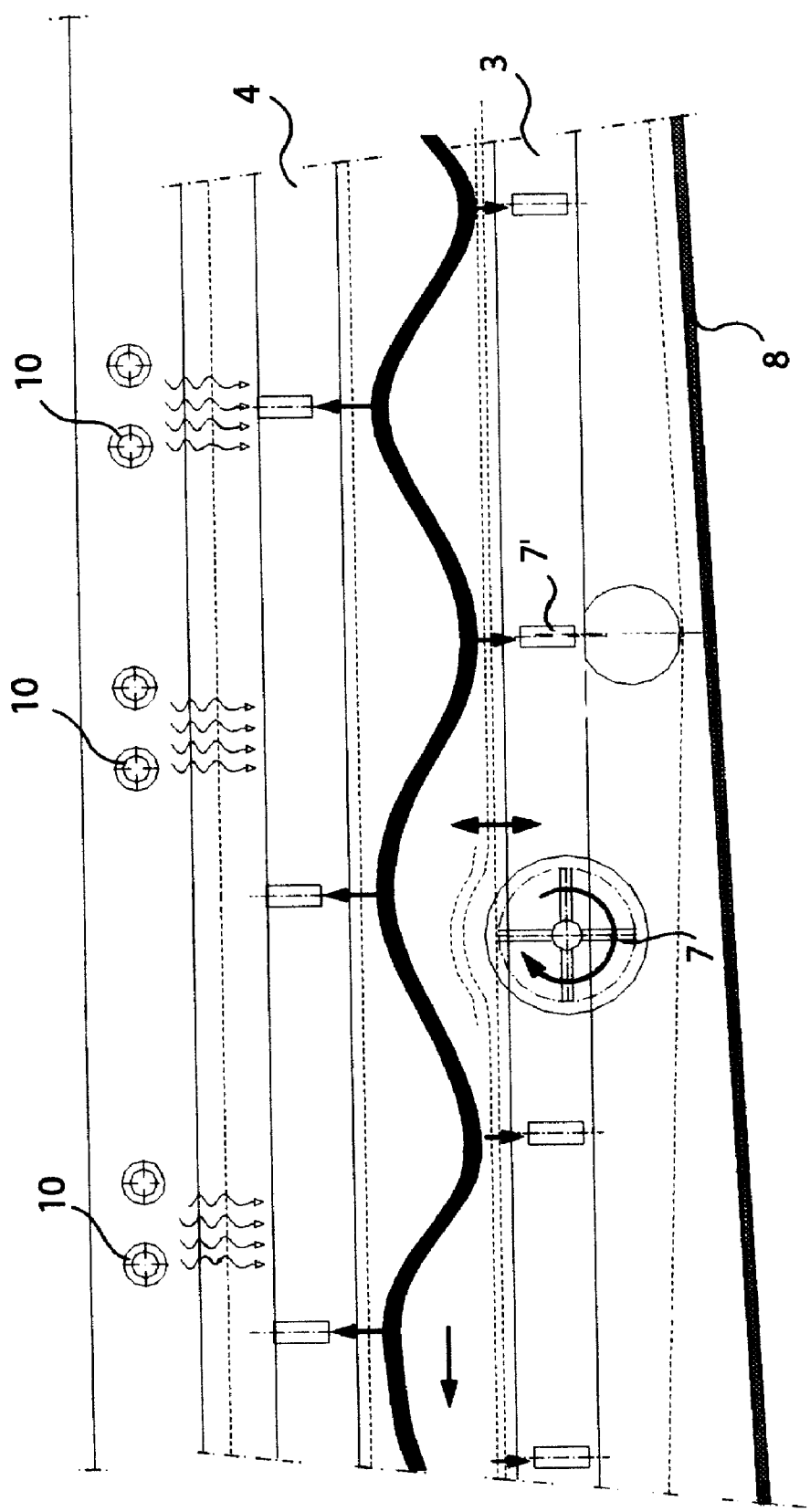
Figure 9:
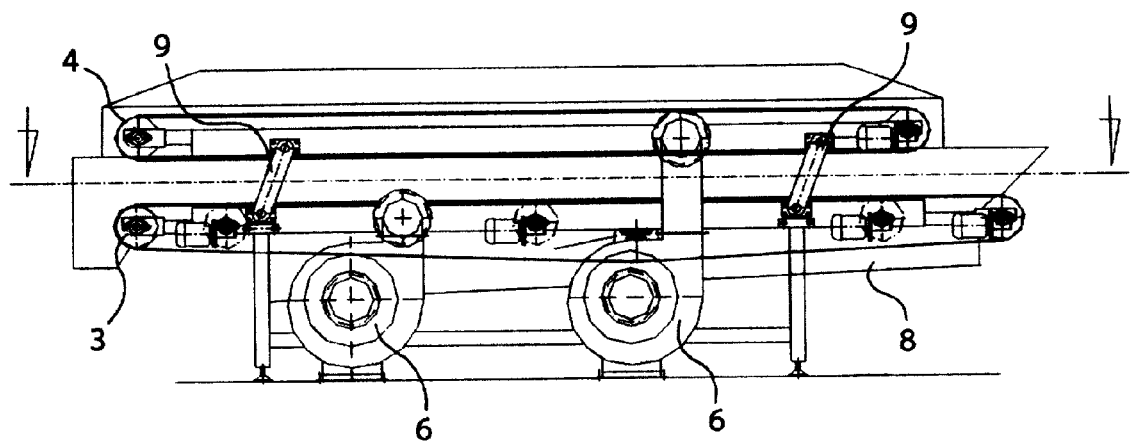
Figure 10:
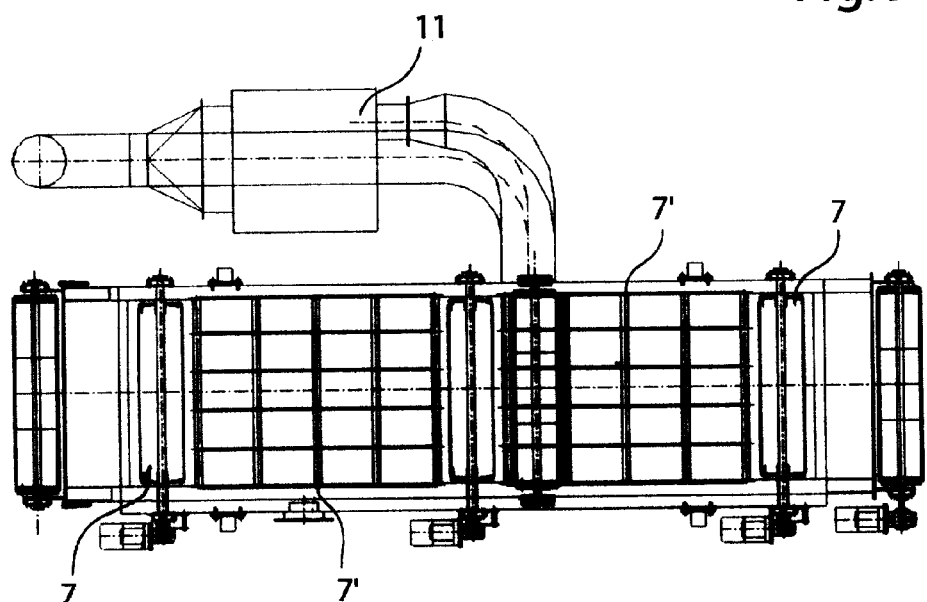
Figure 11:
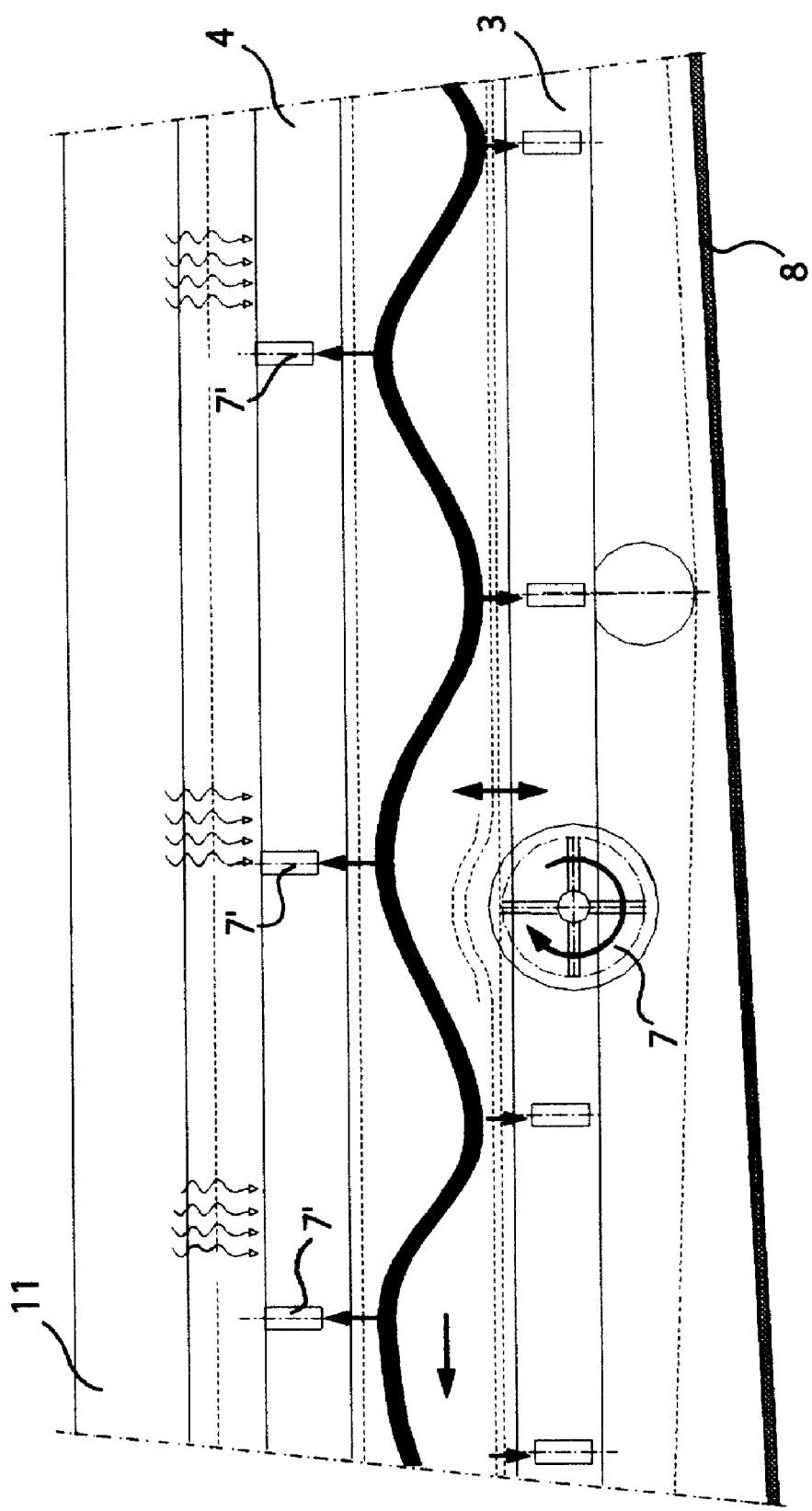
Figure 12:
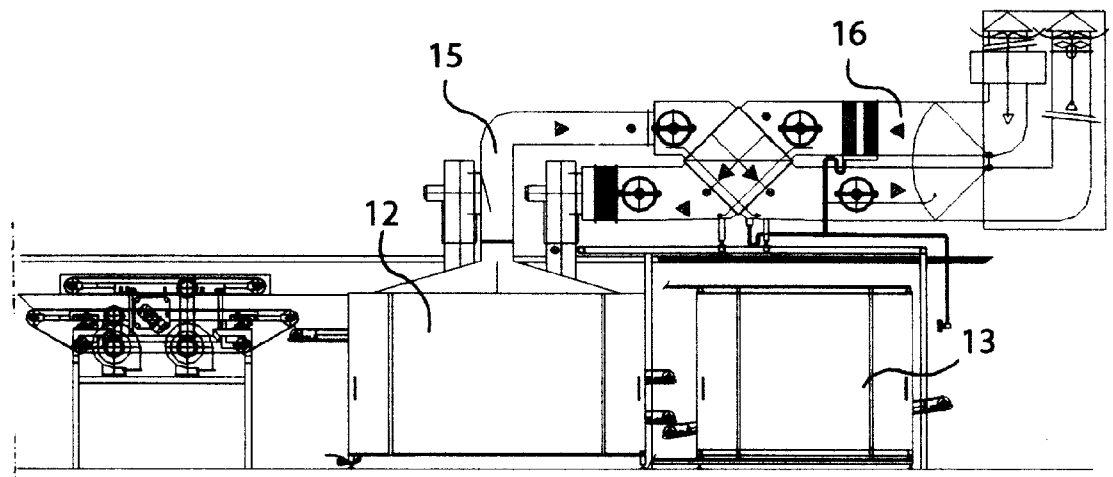

FIG. 5 schematically shows the operation of the section shown in FIGS. 3 and 4;

FIG. 6 is a lateral view of a second embodiment of a second section or de-watering section of the apparatus according to the invention;

FIG. 7 is a lateral view of the section of FIG. 6;

FIG. 8 schematically shows the operation of the section shown in FIGS. 6 and 7;

FIG. 9 is a lateral view of a third embodiment of a second section or de-watering section of the apparatus according to the invention;

FIG. 10 is a lateral view of the section of FIG. 9;

FIG. 11 schematically shows the operation of the section shown in FIGS. 9 and 10;

FIG. 12 shows a whole schema of the apparatus according to the invention; and

Figure 13:
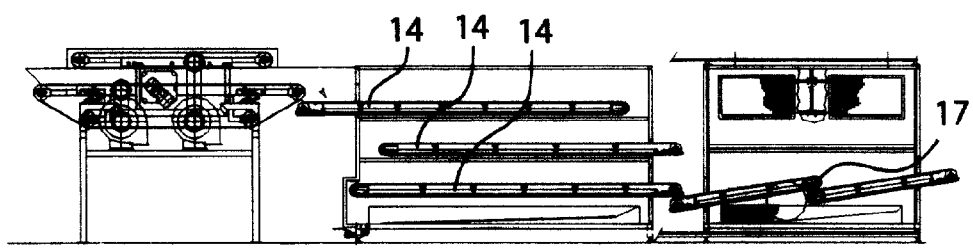

FIG. 13 is a section view of the schema of FIG. 12.

The apparatus according to the invention provides a first mechanical dripping section, in order to reduce the water amount arriving from the thermodynamic section.

In fact, at the exit of the washing machines the content of free water is about 40%–60% in weight of the dry product, in function of the kind of salad. The object of the mechanical separation is that of reducing its presence at a maximum value of 15–16% at the entrance of the thermodynamic drying section in order to reduce the energetic consumption in the last drying cycle.

During this step, free water is easily separable by water elimination operation, or "de-watering", based on the principle of the vibration separation and comprising two sections, and specifically a preliminary dripping section and a real de-watering section.

By the solution suggested according to the present invention, it is possible to noticeably reduce the thermal loads of the thermodynamic section.

Figure 1:
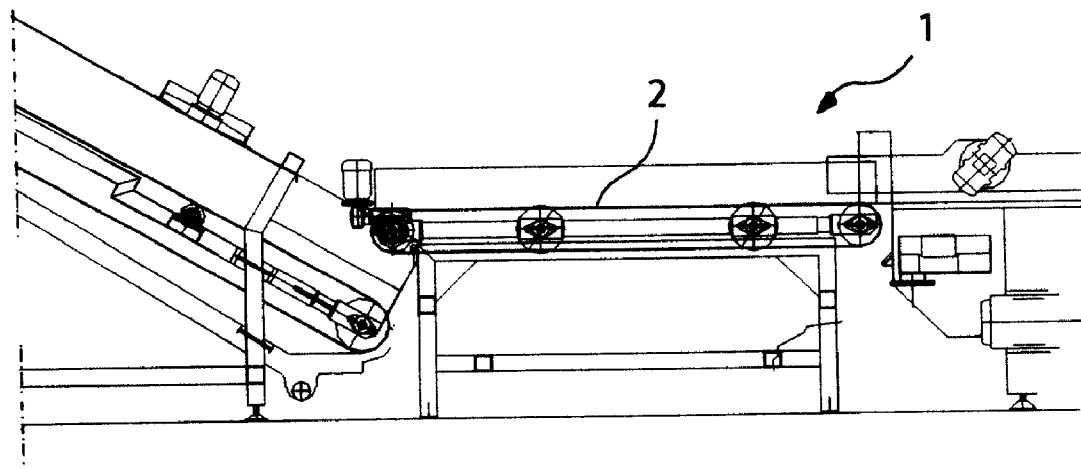
FIG. 1 is a lateral view of a first section of the apparatus according to the invention.
Figure 2:
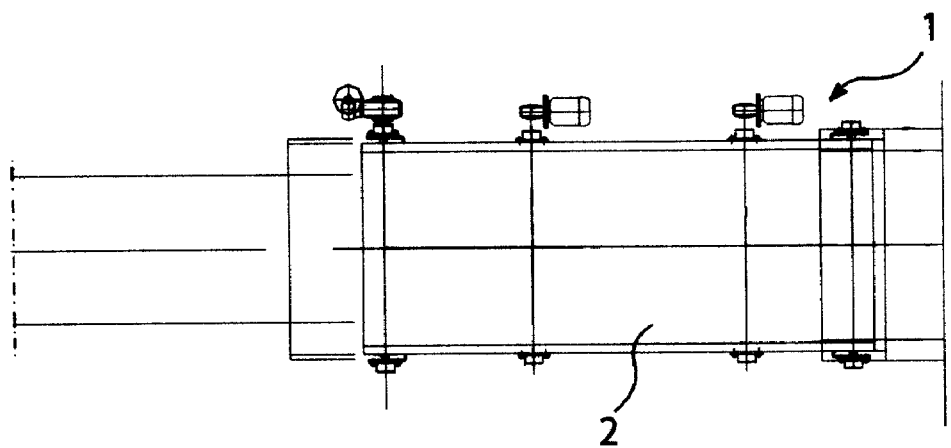
FIG. 2 is a lateral view of the section of FIG. 1.

Observing first FIGS. 1 and 2, it is shown the preliminary dripping belt 1, comprising a conveyor belt 2 mounted on a vibrating section having variable dimensions.

Belt 2 is made up of a plastic material known as "monofilo" material.

During this step, water content is reduced from the initial 60% to the 30%–25% at the outlet.

Coming now to observe FIGS. 3–11 of the enclosed drawings, three embodiments of the de-watering section of the apparatus according to the invention are shown. The same reference numbers will be used to indicate the same elements of the different embodiments.

During this step, a mechanical separation is carried out in order to reduce the presence of water down to about 15%–10% with respect to the dry product.

The section provides a steel structure, preferably comprised of stainless steel AISI 304, a monofilo lower belt 3 having a vibration system in the initial section, a high rated vacuum pump (not shown), for sucking water separated from the product due to the vibrations and to the upper ventilation effect, a monofilo upper belt 4, comprised of a metallic or plastic net, a high rate vacuum pump (not shown), for sucking the separated water from the product, due to the vibrations and the upper ventilation effect, a metallic cope 5, provided with inspection porthole on the upper part, three upper fans 6' provided with adjustable flaps to adjust air flows and the consequent motion of the products.

By the numeral number 6 it is indicated the beating roll, while the air diffusion system is indicated by reference number 7'. Air collection tank is instead indicated by the reference number 8, and the adjustment connecting rod for adjusting the distance between the belts 3 and 4 and is indicted by the reference number 9.

Time of residence in this section can be adjusted, and is preferably of about 1 minute.

The product (salad, legumes or fruit) is transported by a holed lower belt 3, usually stainless steel or plastic monofilo.

In some zones of the belt 3, vibrating rotors or beating rolls 7 are provided, shaking the belt and dripping the surface water.

A suitable conduit provided in the lower part of the belt 3 sucks water on the surface by a vacuum pump.

Structurally, upper belt 4 is identical to the lower one, with the sole difference that an upper ramp is provided adhering to the return of the belt 4 sucking water on the surface by a vacuum pump.

Distance between the two belts 3, 4 can be adjusted in function of the kind of product to be worked by the connecting rods 9.

In FIGS. 3–5 it is shown an embodiment of the described section, providing a purely mechanical action to eliminate water, while in the embodiment shown in FIGS. 6–8, it is shown a solution providing an electric resistance 10.

A third solution is that shown in FIGS. 9–11, providing instead the elimination of water by de-humidified air, employing a de-humidificator Coming now to observe FIGS. 12 and 13 of the enclosed drawings, beside being it possible to observe the whole apparatus according to the invention, it can be individuated the final part of the same apparatus, and particularly the second part of the drying process.

Generally speaking, it is a thermodynamic section, comprising a hot section 12 and a cold section 13.

Said hot section 12 provides a recirculation air working.

Air is sucked, carefully filtered and pre-heated on a battery operated by hot water (Ti=80° C., Tu=60° C.) or steam.

Process air temperature is 35° C.–45° C. and is adjusted by a probe acting on the heating fluid feeding motorized valve with a constant flow rate.

The use of high temperatures for water or steam to heat the process air allows the reduction of the dimensions of the heat exchangers and a wide possibility of adjustment of the drying temperature.

De-humidification unit is provided with an automatic device for saving energy with a passage from outer air operation mode (winter mode) to recirculation air operation mode (summer mode).

The apparatus according to the invention is set in such a way to reveal the enthalpies of outer air and recirculation air and to use the more convenient operation conditions, even maintaining working parameters constant.

Drying bed is comprised of three conveyors 14, overlapped in order to increase the efficiency of the system and to reduce the dimensions of the apparatus. Each one of the three conveyors 14 is provided with electronic speed variator, having a Vmax/Vmin ratio=4, in order to precisely adjust the drying time for each step.

Conveyor belts 14 are comprised of monofilo synthetic material, with the largest opened surface and diameter of the holes compatible with the specific product, They are mounted overlapped on a common structure and are limited within a insulated stainless steel structure, carefully realized in order to prevent by-pass.

Drying process occurs counter-current, with feeding of the product laterally from the above and entrance from the bottom opposite side.

Exchange batteries are assembled within an air treatment central, comprising a heat regenerator allowing an energetic saving of about 40% on both air flows.

Condensation of evaporated air occurs on one of the batteries and it is fed by glicolated water at −1° C./0° C. On the other battery, it is carried heating of air flow at the temperature required by the process. Air temperature in the two zones are regulated by PLC controlled automatic systems. Temperature, flow rate and humidity meters, shown on the PLC panel, complete the system and allow the full adjustment of the process parameters. Ventilating section, comprises an inverter controlled, stainless steel centrifugal fan.

Outer structure of the tunnel 15 is comprised of sandwich panels having a foamed polyurethane interspace, 40 kg/m$^3$, with stainless steel coating sheets, having a thickness of 5/10 mm.

Both outer side and inner side are perfectly smooth in order to allow a perfect cleaning.

It is provided a cabin having a completely openable slidable door, to access to the belts 14, said belts being easily removable for cleaning purposes. Cabin is slightly overpressured by the feeding ventilation group. Air ejected is collected by a stainless steel conduit 16 to be conveyed to the air treatment unit.

Cooling section 13 is comprised of a tunnel having the same characteristic of the previous tunnel, but with a "single passage".

Particularly, it is provided a ventilating section comprised of two helicoidal fans and two batteries fed by glicolated water. Conveyor belt 17 has the same features of the ones of the hot section 12 and is provided with PLC controlled electronic speed variator. Air can be dried, until reaching an absolute humidity value of 0.5 g/kg by air dryer of the silica-gel rotor kind, to reduce the condense content in the first part of the cooling section 13.

In the second part of the cooling section 13, air temperature is of about 2° C./4° C., and is obtained by simply mechanical cooling. This allows faster cooling time with advantages for the hygiene of the product and of its final temperature. Cooling time is of about 4 minutes. Both air temperature and belt speed are in any case adjustable.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. Apparatus for continuously drying vegetables, including leaf vegetables, comprising a mechanical drying section and a thermodynamic drying section, said mechanical drying section comprising a preliminary dripping section and a water removal section, or de-watering section, and said thermodynamic drying section comprising a hot section and a cold section and wherein said preliminary dripping section comprises a conveyor belt on a vibrating section having variable dimensions.

2. Apparatus according to claim 1, wherein said conveyor belt is a plastic material belt, wherein the plastic material belt is monofilo.

3. Apparatus according to claim 1, wherein said water removal section or de-watering section comprises a structure, a monofilo lower belt with a vibration system in an initial section of the water removal section, a first high rate vacuum pump, for sucking water separated from the product due to the vibrations and to an upper ventilation effect, a monofilo upper belt, wherein said monofilo upper belt is comprised of a metallic or plastic net, a second high rate vacuum pump, for sucking the separated water from the product, due to vibrations and an upper ventilation effect, three upper fans, provided with adjustable flaps to adjust air flows and the consequent motion of the products, and collection means for the removed water.

4. Apparatus according to claim 3, wherein upper protection means are provided, said means being provided with an inspection porthole of an upper part.

5. Apparatus according to claim 3, wherein means for the adjustment of the distance between said two belts are provided, the adjustment occurring in function of the kind of product to be worked.

6. Apparatus according to claim 3, wherein said water removal action are realized by mechanical action, employing pre-heated air or de-humidified air.

7. Apparatus according to claim 1, wherein said hot section of the thermodynamic drying section provides a recirculation air operation.

8. Apparatus according to claim 7, wherein said hot section provides a hot water of vapor operated battery, having an air process temperature adjustment probe, acting on a motorized valve feeding the heating fluid with a constant air flow rate, a de-humidification unit, said de-humidification unit is provided with an automatic device for the energetic saving with the switching from outer air operation mode (winter mode) to recirculation air operation condition (summer mode), a drying bed, said drying bed comprised of three overlapped conveyors, each one provided with electronic speed variator, having a Vmax/Vmin ratio of 4, exchange batteries, assembled within an air treatment console, comprising a heat regenerator, allowing an energy saving of about 40% on both air mode flows, evaporated water condensation occurring on one battery, said battery being fed by glicolated water, or with other refrigerating fluid, at a temperature of −1° C./0° C. while on the other battery the heating of the air flow to the temperature required by the process, is carried out, a PLC controlled automatic system, as well as temperature, flow rate and humidity meters being provided, the ventilating section of the hot section being comprised of a centrifugal fan.

9. Apparatus according to claim 8, wherein said conveyor belts are made up of monofilo synthetic material, having a larger open surface and hole diameter compatible with the product to be worked, said conveyor belts being mounted overlapped on a common structure and placed within a insulated stainless steel structure, in order to prevent by-pass.

10. Apparatus according to claim 7, wherein said drying process occurs counter-current, with the feeding of the product laterally from above and entrance of air from the opposite bottom side.

11. Apparatus according to claim 7, wherein the outer structure of the tunnel of a hot section is comprised of sandwich panels having a foamed polyurethane interspace, provided with stainless steel coating sheets.

12. Apparatus according to claim 7, wherein air ejected from said hot section is collected by a stainless steel duct, to be conveyed to the cooling unit.

13. Apparatus according to claim 1, wherein said cooling section is comprised of a single passage tunnel, and is provided with a ventilating section comprising two helicoidal fans and two batteries fed by glicolated water, or any other refrigerating fluid, a conveyor belt provided with PLC controlled electronic speed variety, an air dryer of the adsorption kind with silica-gel rotor, to reduce condense content in a first part of the cooling section, and mechanical cooling means, comprising a second part of the cooling section.

14. Apparatus according to claim 13, wherein both the air temperature and the belt speed of the cooling section are adjustable.

* * * * *